(12) United States Patent
Yagita et al.

(10) Patent No.: US 6,323,579 B1
(45) Date of Patent: Nov. 27, 2001

(54) ULTRASONIC DRIVING MOTOR

(75) Inventors: Yasunobu Yagita; Hisao Kurata; Keichi Sato, all of Toyohashi; Shoji Takahashi; Yuji Maeda, both of Fuchu, all of (JP)

(73) Assignee: Honda Electronics Co., Ltd., Aichi-ken (JP)

( * ) Notice: Subject to any disclaimer, the term of this patent is extended or adjusted under 35 U.S.C. 154(b) by 0 days.

(21) Appl. No.: 09/510,316

(22) Filed: Feb. 22, 2000

(30) Foreign Application Priority Data

| Feb. 26, 1999 | (JP) | ................................................ | 11-049963 |
| Feb. 26, 1999 | (JP) | ................................................ | 11-049969 |
| Jul. 6, 1999 | (JP) | ................................................ | 11-192233 |
| Jul. 6, 1999 | (JP) | ................................................ | 11-192236 |

(51) Int. Cl.$^7$ ............................. H01L 41/06; H01L 41/08
(52) U.S. Cl. ............................. 310/323.09; 310/323.04; 310/316.01
(58) Field of Search ....................... 310/323.01, 323.03, 310/323.04, 323.09, 316.01, 316.02

(56) References Cited

U.S. PATENT DOCUMENTS

| 4,562,374 | * | 12/1985 | Sashida | ............................. | 310/328 |
| 4,608,651 | * | 8/1986 | Murakami et al. | ............................. | 364/513 |
| 5,493,164 | * | 2/1996 | Nogarede | ............................. | 310/323 |
| 5,886,453 | * | 3/1999 | Kyodo | ............................. | 310/316.01 |
| 6,031,316 | * | 2/2000 | Kataoka | ............................. | 310/316 |
| 6,201,338 | * | 3/2001 | Naito et al. | ............................. | 310/323.05 |

* cited by examiner

Primary Examiner—Brian Sircus
Assistant Examiner—Michael C. Zarroli
(74) Attorney, Agent, or Firm—Richard M. Goldberg

(57) ABSTRACT

A fixing member is inserted under pressure into a central hole of an ultrasonic vibrator, a case and a center axle are fixed by a screw, a bearing is fixed on an end portion of the center axle, a rotor is mounted to rotate by the bearing, a connection member is fixed to the rotor, projections are formed on the edge of a disk of the connection member, spaces are formed between the projections respectively, a contact member is composed by inserting ends of divided parts into spaces of the connection member, and a ring-like elastic member is mounted on the contact member which is pressed on the ultrasonic vibrator.

11 Claims, 16 Drawing Sheets

ULTRASONIC DRIVING MOTOR

BACKGROUND OF THE INVENTION

The present invention relates to an ultrasonic driving motor in which a plurality of divided parts of a contact member are contacted with an ultrasonic vibrator by pressing with a ring-like elastic material, and a control apparatus is provided for driving the ultrasonic driving motor.

In an ultrasonic driving motor in the prior art, slide projections are made in the inside of a resilient ring frame of a rotor having a separated portion in the resilient ring frame, and the slide projections are pressed on a piezoelectric vibrator by opening the separated portion of the resilient ring frame. A rubber ring is inserted into a groove of the outside of the resilient ring frame, whereby the slide projections of the rotor are pressed on the piezoelectric vibrator.

In the ultrasonic driving motor, however, the rotor cannot be efficiently rotated by elliptically progressive waves generated on the edge of the piezoelectric vibrator, because the projections of the resilient ring frame of the rotor are contacted with the piezoelectric vibrator by leaving the spaces of the projections.

SUMMARY OF THE INVENTION

It is, therefore, the primary object of the present invention to provide an ultrasonic driving motor for efficiently transmitting a progressive wave to a contact member by pressing the whole edge of an ultrasonic vibrator with the contact member consisting of a plural divided parts by a ring-like elastic material.

It is another object of the present invention to provide an ultrasonic driving motor in which a rotor is rotated by rotating the contact member and the rotor is axially connected to the contact member.

It is another object of the present invention to provide an ultrasonic driving motor in which revolution of the rotor is detected by an encoder, the output of a voltage to frequency convertor is converted by the output of the encoder, and a small number of the output and a phase of a digital to analogue convertor are changed by the output of the encoder, whereby optimum frequency to the revolution number of the rotor is regulated.

In order to accomplish the above and other objects, the present invention comprises an ultrasonic vibrator having a center hole and an edge generating elliptically progressive waves, a contact member with plural divided parts contacted with each other, a ring-like elastic member for pressing the contact member to the edge of the ultrasonic vibrator, a fixing member fixed in the center hole of the ultrasonic vibrator, a rotor mounted to rotate by a bearing mounted to the fixing member, a connection member for connecting the contact member to the rotor.

DESCRIPTION OF THE PREFERRED EMBODIMENTS

Figure 1:
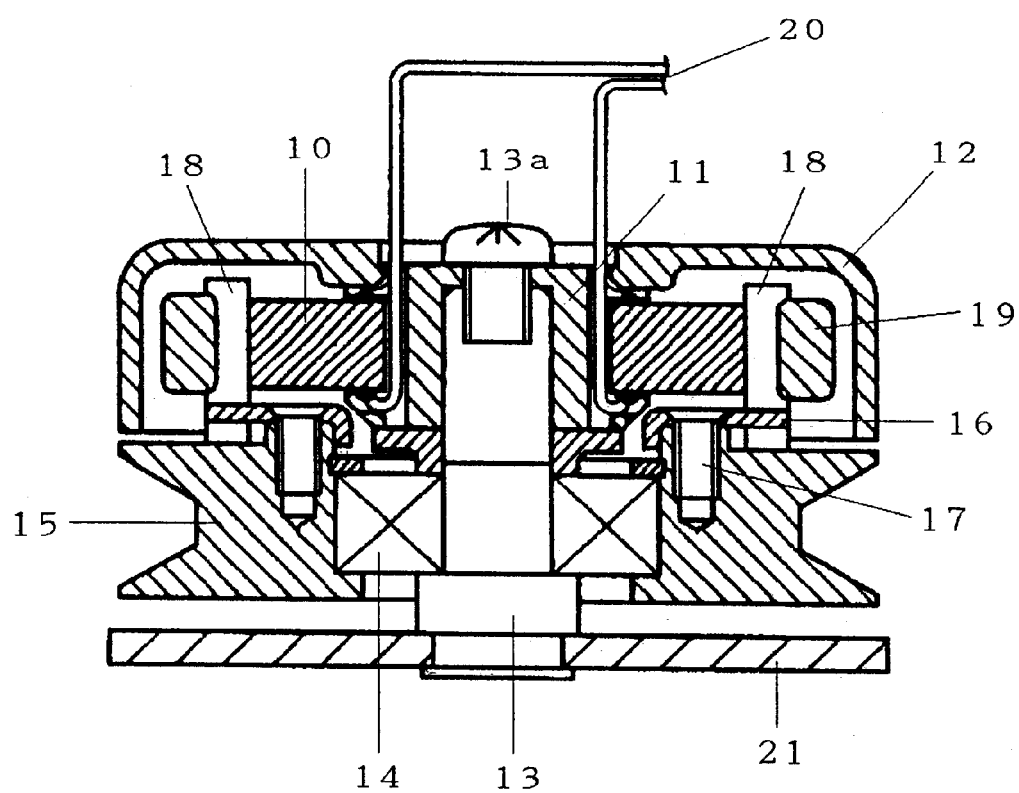
FIG. 1 shows a side sectional view of an ultrasonic driving motor in the embodiment of the present invention.
Figure 2:
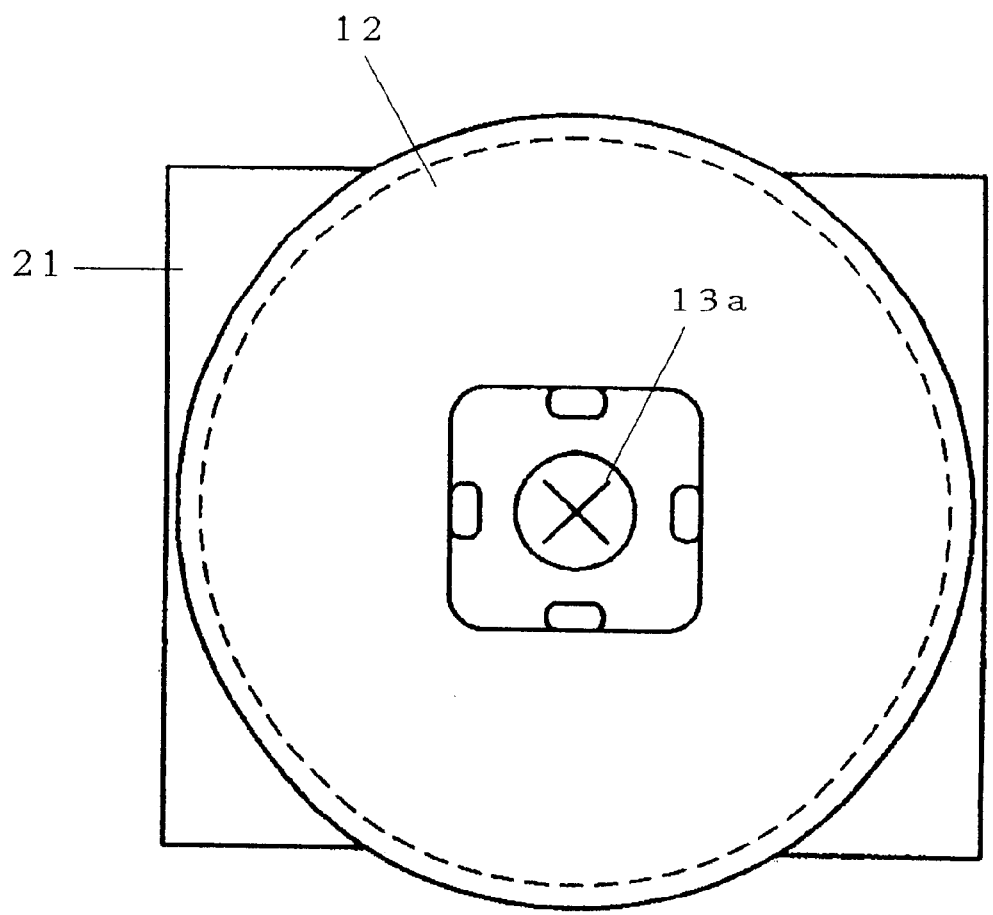
FIG. 2 shows a plan view of an ultrasonic driving motor in FIG. 1.

As shown in FIGS. 1, 2, 3, and 4, a fixing member 11 is fixed in center hole of an ultrasonic vibrator 10. A case 12 and a center axle 13 are fixed together a screw 13a. A bearing 14 is mounted on the center axle 13, a rotor 15 is mounted to rotate the bearing 14, and a connection member 16 is, connected to the rotor 15 by a screw 17.

Figure 3:
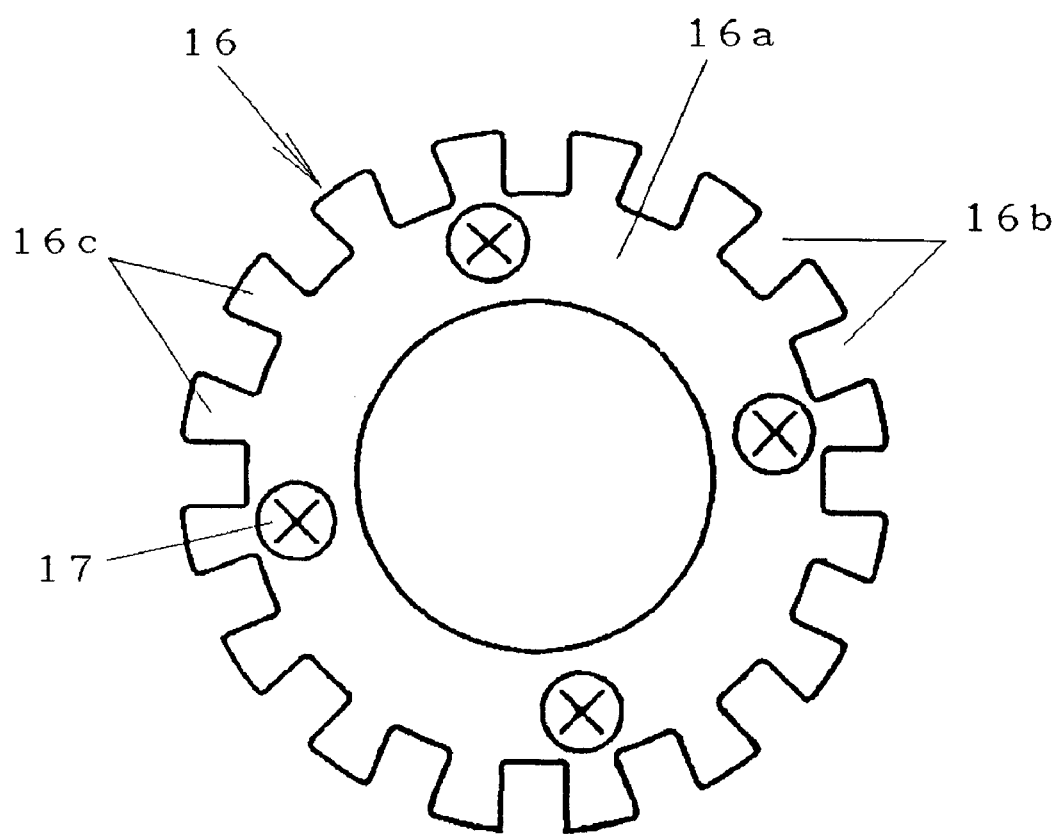
FIG. 3 shows a plan view of a connection member in FIG. 1.
Figure 4:
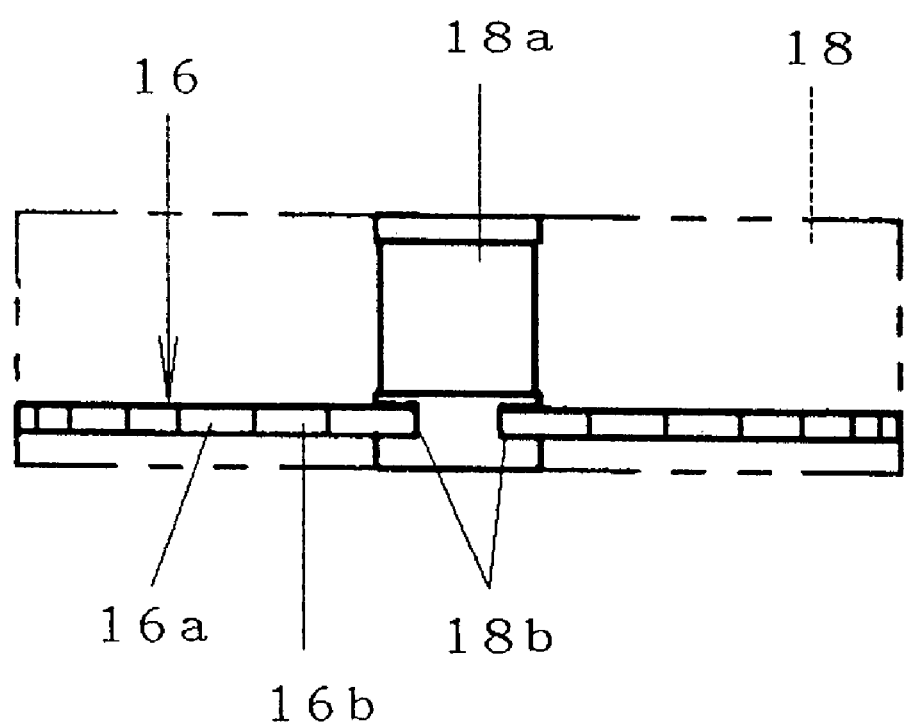
FIG. 4 shows a side view of a connection member and a contact member.

As shown in FIG. 3, the connection member 16 has plural projections 16c formed at the edge of a disk 16a of the connection member 16 and spaces 16b respectively formed between each adjacent two projections 16c. Cut portions 18b of divided parts 18a are respectively inserted into the spaces 16b, with the edges of the projections 16c inserted into cut portions 18b. The divided parts 18a are mounted in all of the spaces 16b of the connection member 16, whereby a contact member 18 is formed with the divided parts 18a. The contact member 18 is pressed and contacted on the ultrasonic vibrator 10 by mounting a ring-like elastic member 19 outside the contact member 18.

In the ultrasonic driving motor in the present invention, when an oscillating output is applied to a lead line 20 of the ultrasonic driving motor, since elliptically progressive waves are generated on the edge of the ultrasonic vibrator 10, the contact member 18 contacted under pressure with the edge of the ultrasonic vibrator 10 by the elastic member 19 is rotated, and the rotor is rotated through the connection member 16 by rotating the contact member 18. Since this rotor 15 is formed as a pulley, another rotor can be rotated though a ring-like belt by the rotor 15.

In the present embodiment, the contact member 18 is efficiently rotated by the elliptically progressive waves generated on the edge of the ultrasonic vibrator 10, because the contact member 18 formed of the plural divided parts 18a is contacted under pressure with the edge of the ultrasonic vibrator 10. Also, the ultrasonic driving motor is simply constituted by composing each part and the external form of the ultrasonic driving motor becomes small, because the contact member 18 and the rotor 15 are connected in the direction of the axle of the ultrasonic vibrator 10.

The case 12 covers the outside of the contact member 18 and a cover 21 is fixed to the end portion of the central axle 13, whereby the rotor cannot be touched by hand.

Figure 5:
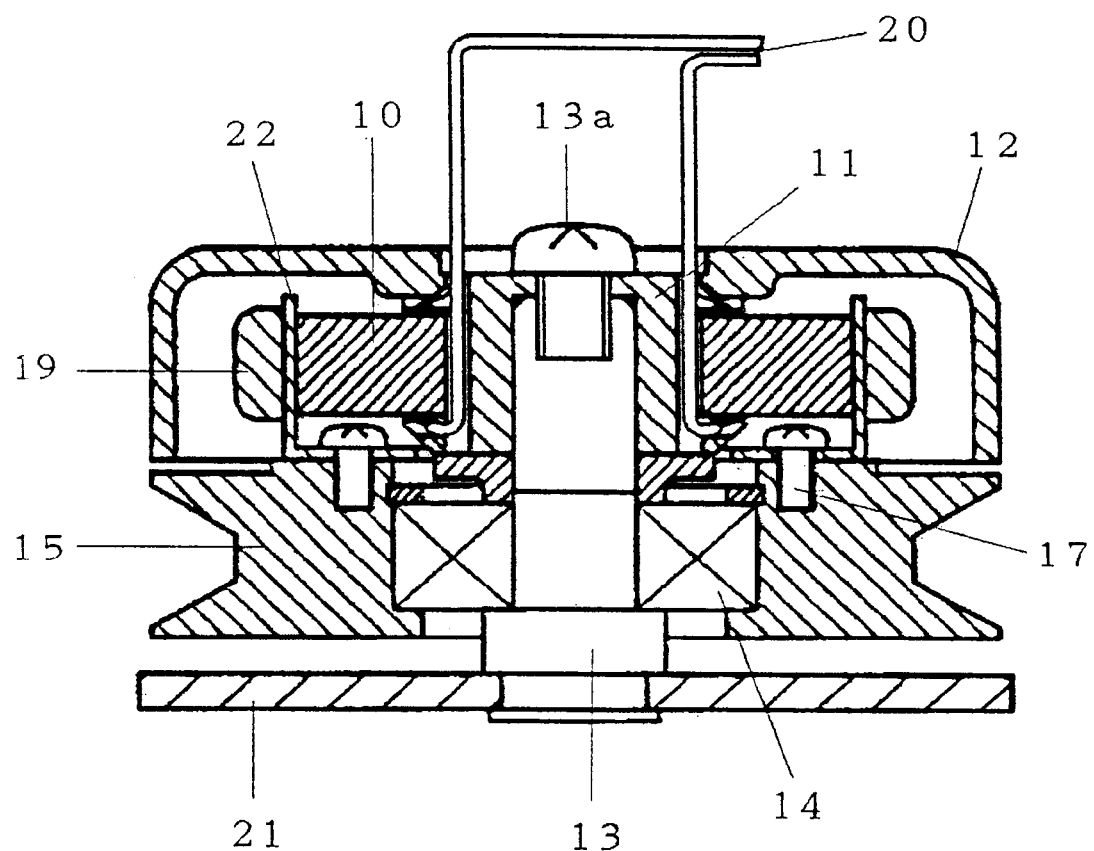
FIG. 5 shows a side sectional view of an ultrasonic driving motor in another embodiment of the present invention.
Figure 6:
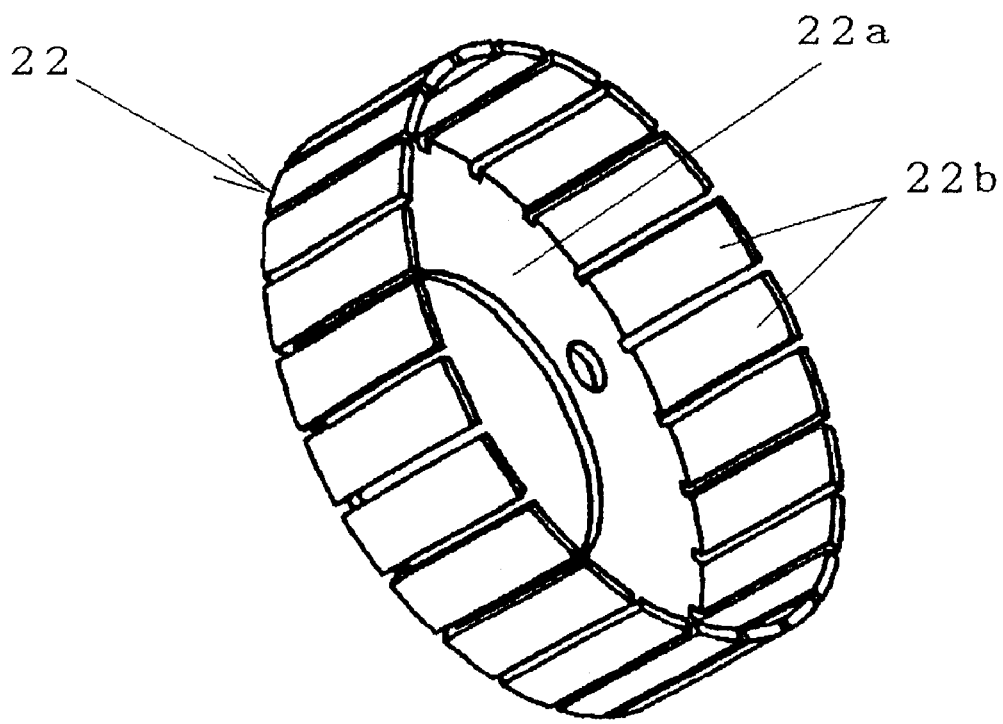
FIG. 6, shows a perspective view of a connection member in FIG. 5.

Referring to FIG. 5, 10 designates an ultrasonic vibrator, 11 a fixing member, 12 a case, 13 a central axle, 13a a screw, 14 a bearing, 15 a rotor, 17 a screw, and 19 a ring-like elastic member. These constitutions are the same as those of the above embodiment and the explanation of those constitutions is omitted. In the present embodiment, as shown in FIG. 6, a contact member 22 consists of a plurality of divided parts 22b vertically fixed to the edge of the disc connection member 22a. The divided parts 22b of the contact member 22 are contacted under pressure with the ultrasonic vibrator 10 by the ring-like elastic member 19 on the outside of the divided parts 22b.

Figure 7:
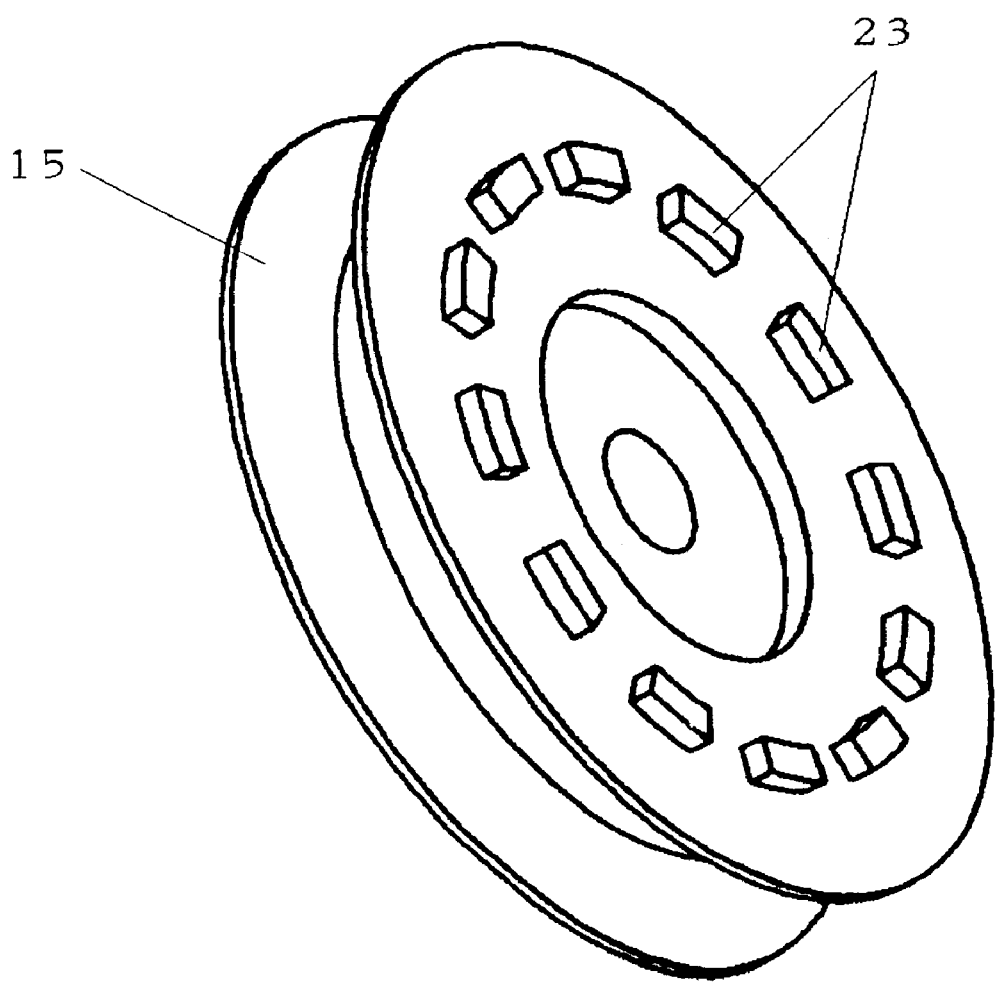
FIG. 7 shows a perspective view of a rotor of an ultrasonic driving motor in the other embodiment of the present invention.
Figure 8:
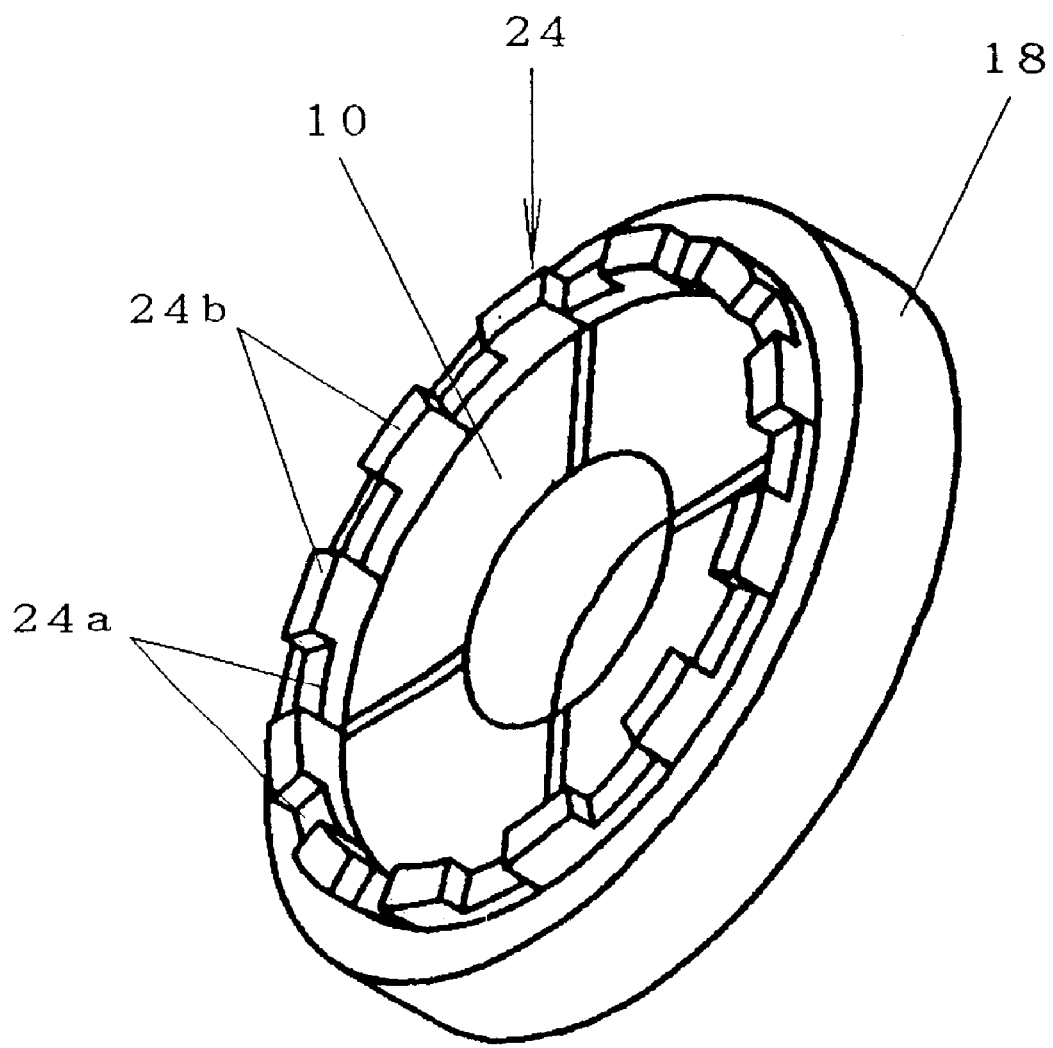
FIG. 8 shows a partial perspective view of an ultrasonic driving motor in another embodiment of the present invention.
Figure 9:
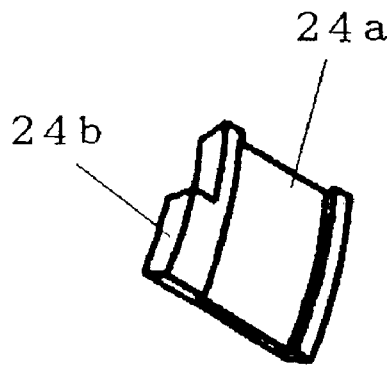
FIG. 9 shows a partial perspective view of a connection member in FIG. 8.

Referring to FIGS. 7 and 8, a connection member 23 consists of plural projections formed on the side of the rotor 15, and a contact member 24 consists of plural divided parts 24a having plural projections 24b in the end of the divided parts 24a as shown in FIG. 9, these divided parts 24a are contacted under pressure with the ultrasonic vibrator 10 by the ring-like elastic member 19 and the projections 24b are respectively inserted between the connection members 23 and are connected to the connection member 23.

In such composition of this embodiment, since the connection member 23 is projected from the side of the rotor 15, a screws for fixing the connection member 23 to the rotor 15 are omitted.

Figure 10:
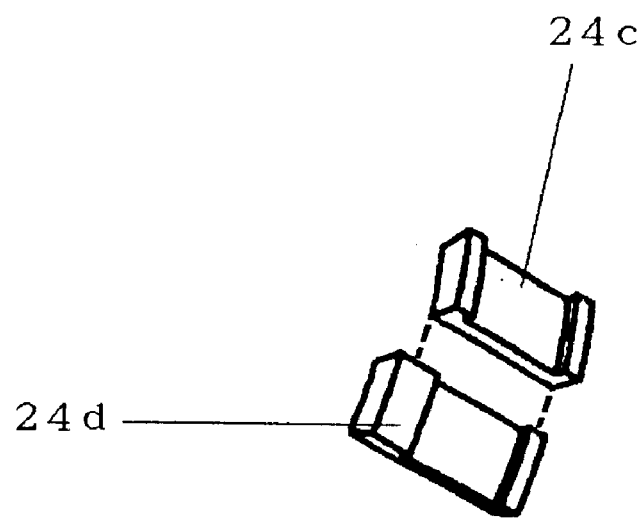
FIG. 10 shows a partial perspective view of another connection member for use in FIG. 8.

Though the projections 24b are formed at one end of the divided parts 24a in FIG. 9, it is possible, as shown in FIG. 10, that the divided part 24a is formed by two, divided parts 24c and 24d and, the divided part 24c is made longer than divided part 24c, with the projection being formed in the divided part 24d.

In the ultrasonic driving motor in the present embodiment, since the contact member consisting of the plural divided parts is contacted under pressure with the ultrasonic vibrator by the ring-like elastic member, the contact member can be efficiently rotated by the elliptically progressive waves and the ultrasonic driving motor becomes small, because the contact member and the rotor are connected in the direction of the axle of the ultrasonic vibrator 10.

Figure 11:
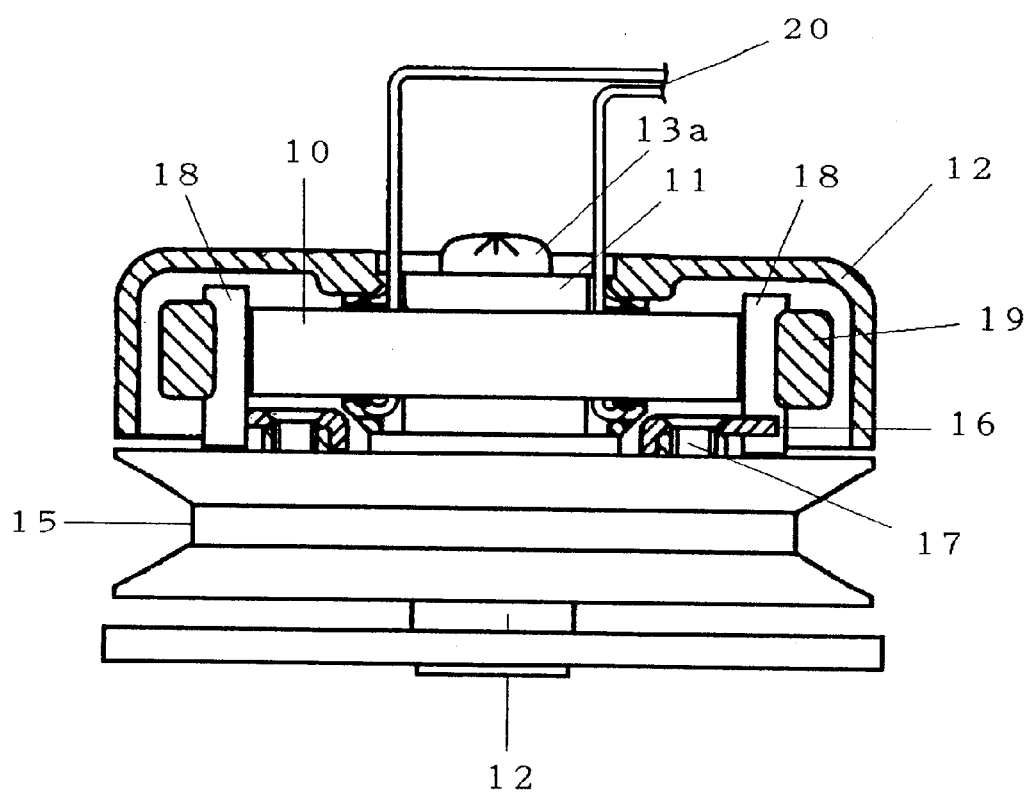
FIG. 11 shows a side sectional view of an ultrasonic driving motor in another embodiment of the present invention.
Figure 12:
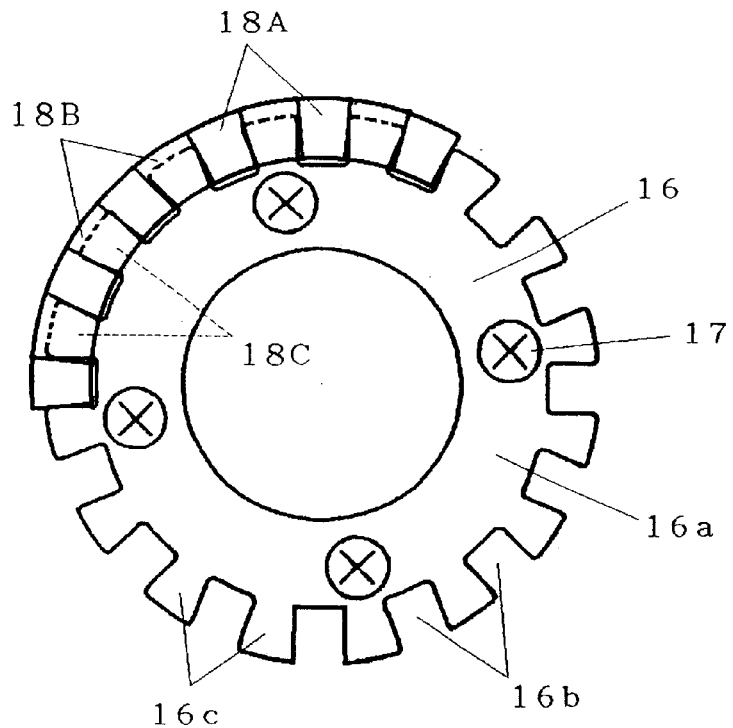
FIG. 12 shows a plan view of a connection member and a contact member in FIG. 11.
Figure 13:
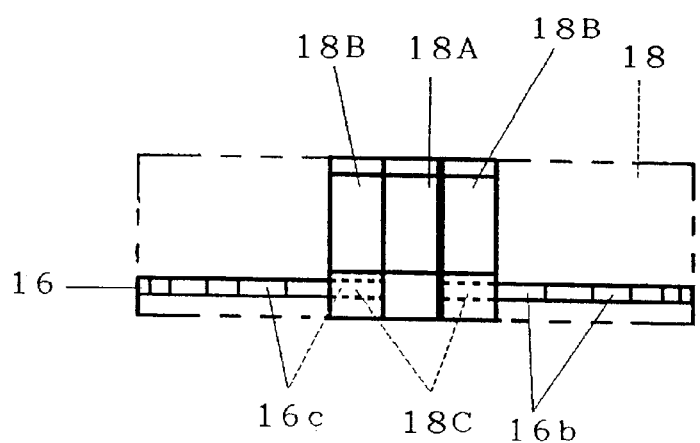
FIG. 13 shows a side view of a connection member and a contact member in FIG. 11.

Referring to FIG. 11, 10 designates an ultrasonic vibrator, 11 a fixing member, 12 a case, 13 a central axle, 13a a screw, 15 a rotor, 16 a connection member, 17 a screw, 18 a contact member, 19 a ring-like elastic member and 20 a lead line. These constitutions are the same as those of the above embodiment so the explanation of those constitutions are omitted. In the present embodiment, as shown in FIGS. 12 and 13, the contact member 18 consists of divided parts 18A of square rods inserted into the spaces 16b of the connection member 16 and divided parts 18B respectively having the same form of the divided parts 18A but with cut portions 18C for inserting the projections 16c of the connection member 16. The contact member 18 is composed by alternately mounting the divided parts 18A and 18B. Then, the elastic member 19 is mounted on the outer portion of the divided parts 18A and 18B which are in contact under pressure with the edge of the ultrasonic vibrator 10.

In this embodiment, since the divided parts 18A and 18B are formed in the same form, and the cut portion 18C is formed near the end of the divided part 18B, the composition of the contact member 18 becomes very simple.

Figure 14:
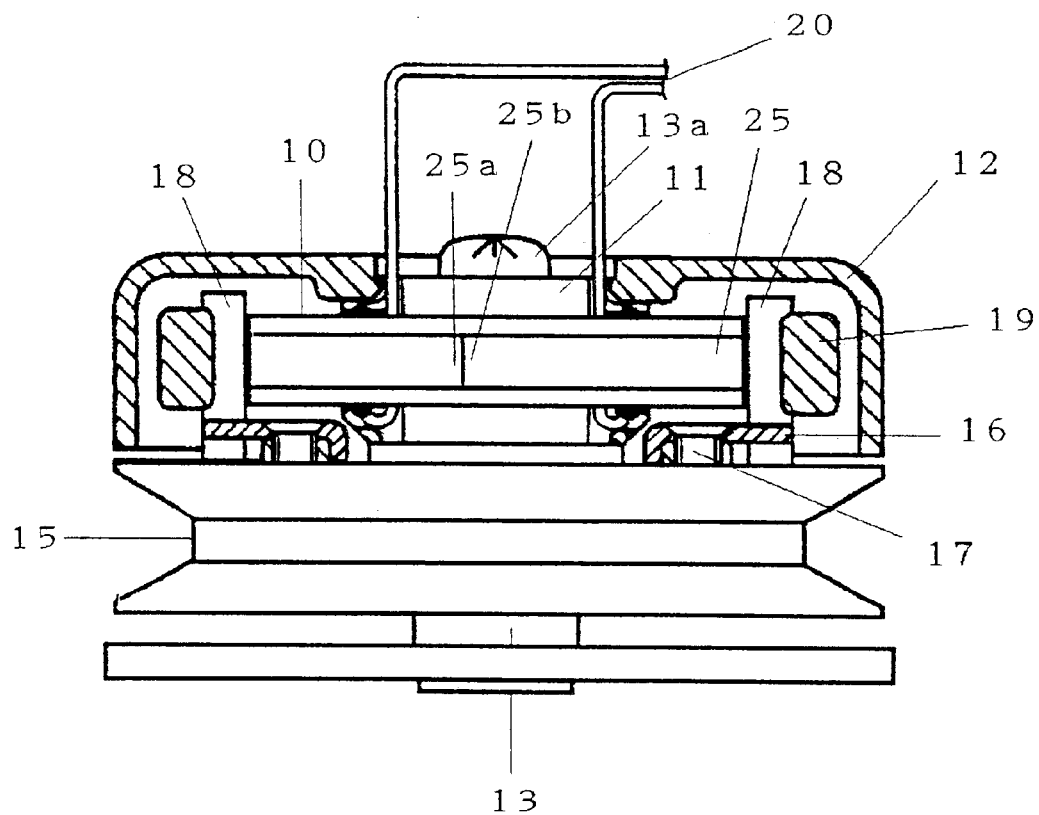
FIG. 14 shows a side sectional view of an ultrasonic driving motor in another embodiment of the present invention.
Figure 15:
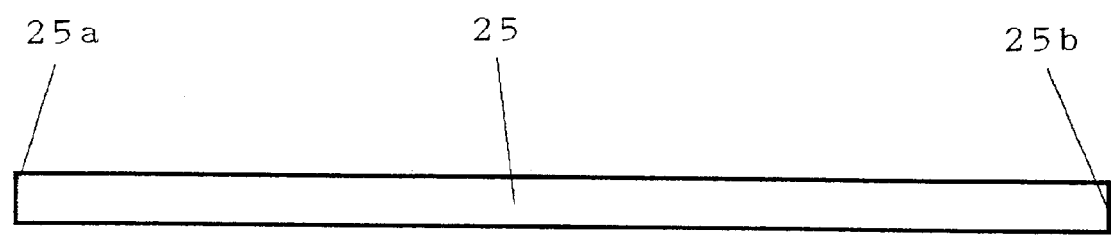
FIG. 15 shows a plan view of a long member for using an ultrasonic driving motor as shown in FIG. 14.

Referring to FIG. 14, 10 designates an ultrasonic vibrator, 11 a fixing member, 12 a case, 13 a central axle, 13a a screw, 15 a rotor, 16 a connection member, 17 a screw, 18 a contact member, 19 a ring-like elastic member and 20 a lead line. These constitutions are the same as those of the above embodiment and the explanation of those constitutions is omitted. In the present embodiment, a thin long sheet 25 shown in FIG. 15 is inserted between the contact member 18 and the ultrasonic vibrator 10. Also, both ends 25a and 25b of the long sheet 15 are rectangularly formed.

In the ultrasonic driving motor in the present embodiment, when oscillating output is applied to the lead lines 20 connected to the electrodes of the ultrasonic vibrator 10, since the elliptically progressive waves are generated on the edge of the ultrasonic vibrator 10, the contact member 18 which is contacted under pressure with the edge of the ultrasonic vibrator 10 by the elastic member 19 is rotated by the elliptically progressive waves and the rotor 15 is rotated with the contact member 18. Then, though noise generates from the ultrasonic driving motor, the rotation of the ultrasonic driving motor becomes smooth the noise is eliminated from the ultrasonic driving motor by the long thin sheet 25 inserted between the contact member 18 and ultrasonic vibrator 10, and the contact member 18 is prevented from abrasion.

Figure 16:
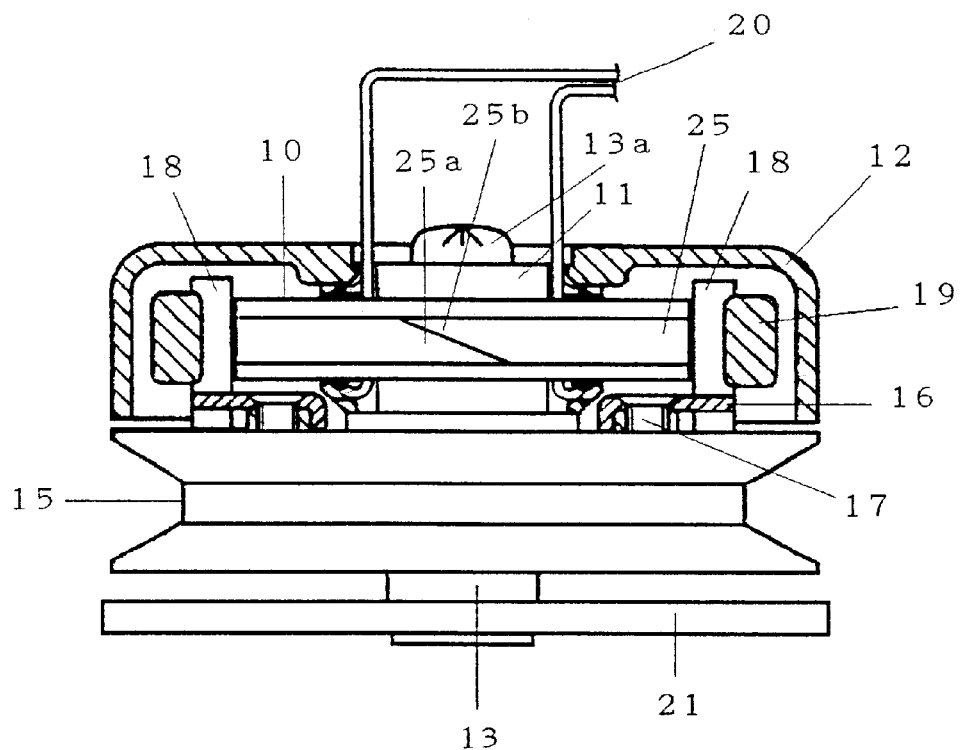
FIG. 16 shows a side sectional view of an ultrasonic driving motor in another embodiment of the present invention.
Figure 17:
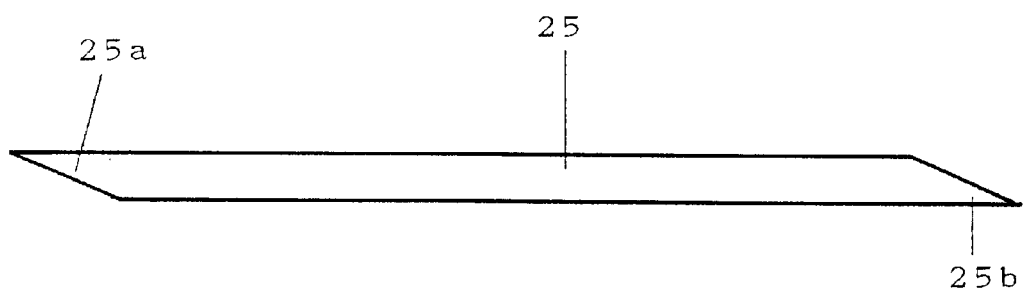
FIG. 17 shows a plan view of a long member for using an ultrasonic driving motor as shown in FIG. 16.

Referring to FIG. 16, 10 designates an ultrasonic vibrator, 11 a fixing member, 12 a case, 13 a central axle, 13a a screw, 15 a rotor, 16 a connection member, 17 a screw, 18 a contact member, 19 a ring-like elastic member and 20; a lead line. These constitutions are the same as those of the above embodiment and the explanation of those constitutions is omitted. In the present embodiment, a thin long sheet 25 as shown in FIG. 17 has both oblique ends 25a and 25b and is inserted between the contact member 18 and the ultrasonic vibrator 10. In this embodiment, when the thin long sheet 25 is caught by the contact member 18 and is twisted by the rotation of the contact member, the both oblique ends of the thin long sheet 25 are prevented from catching in the contact member 18.

Figure 18:
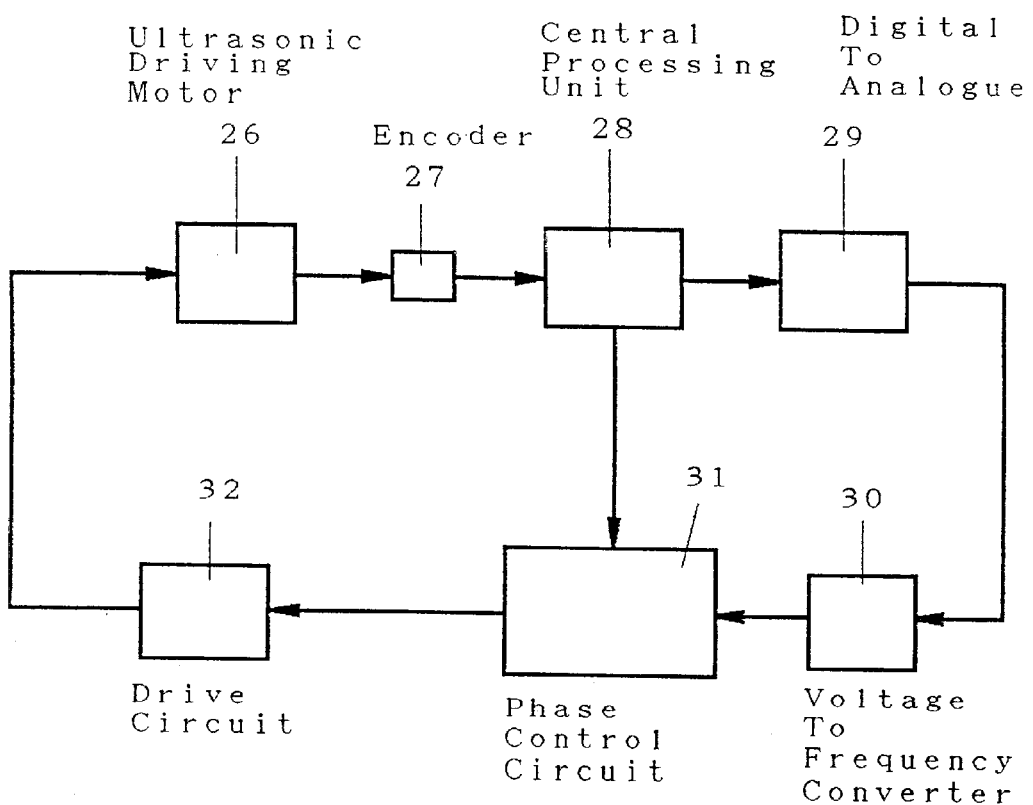
FIG. 18 shows a block diagram of a circuit for controlling an ultrasonic driving motor.

FIG. 18 shows a block diagram of a circuit for controlling an ultrasonic driving motor. Specifically an encoder 27 for detecting the revolution number is connected to an ultrasonic driving motor 26, and the output of the encoder 27 is applied to a central processing unit 28. The output of the central processing unit 28 is applied a digital to analogue converter 29. The clock signals from the central processing unit 28 are converted to voltage signals and are applied to a voltage to frequency converter 30, and the voltage signals are converted to frequency signals.

Then, the frequency signals of output from the voltage to frequency converter 30 are applied to a phase control circuit 31. The phase of the frequency signals from the voltage to frequency converter 30 is changed by the signals of the central processing unit 28 and is applied to a drive circuit 32, and the ultrasonic driving motor 26 is driven by the output from the drive circuit 32.

In the control circuit for controlling the ultrasonic driving motor in the present embodiment, the central processing unit 28 controls the output of the voltage to frequency converter 30 to become a higher frequency than the optimum frequency by the output of the digital to analogue converter 29, and the central processing unit 28 changes the output of the digital to analogue converter 29 to make low the frequency from the voltage to frequency converter 30 while the revolution number of the ultrasonic driving motor 26 is checked by the encoder 27.

Then, when the output of the voltage to frequency converter 29 becomes about the optimum frequency (revolution number), the central processing unit 28 changes in small values the output of the digital to analogue converter 29 and controls a small frequency which cannot be regulated by the resolving power of the voltage to frequency converter 29.

Figure 19:
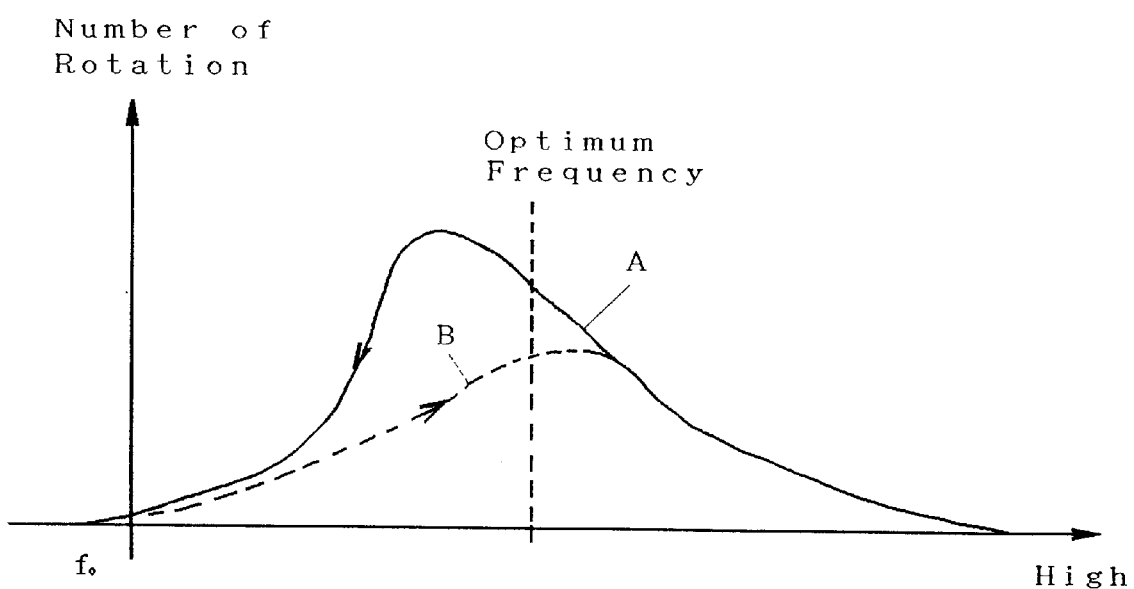
FIG. 19 shows a view for showing a relation of a rotation number and frequency of an ultrasonic motor.

In this embodiment, as shown in FIG. 19, when the revolution number of the ultrasonic driving motor 26 is changed from a high frequency to a low frequency and from a low frequency to a high frequency, though the change of the torque of the ultrasonic driving motor 26 is different from the revolution number thereof and the revolution number of the ultrasonic driving motor 26 is changed by the difference of torque and load, such change is detected by detecting the revolution number of the ultrasonic driving motor 26 by the encoder 27. Thus, the revolution number of the ultrasonic driving motor 26 is regulated to the optimum value by changing the output of the digital to analogue converter 29 in the small value in the central processing unit 28.

The output of the digital to analogue converter 29 may set a predetermined charge to discharge time by a condenser.

As explained above, in the controlling circuit of the ultrasonic driving motor, though the resolving power of the digital to analogue converter is low and a small optimum frequency cannot be fixed, the revolution number of the ultrasonic driving motor is detected by the encoder, and the output of the digital to analogue converter is changed by a small value, whereby the ultrasonic driving motor is rotated at an optimum frequency.

Figure 20:
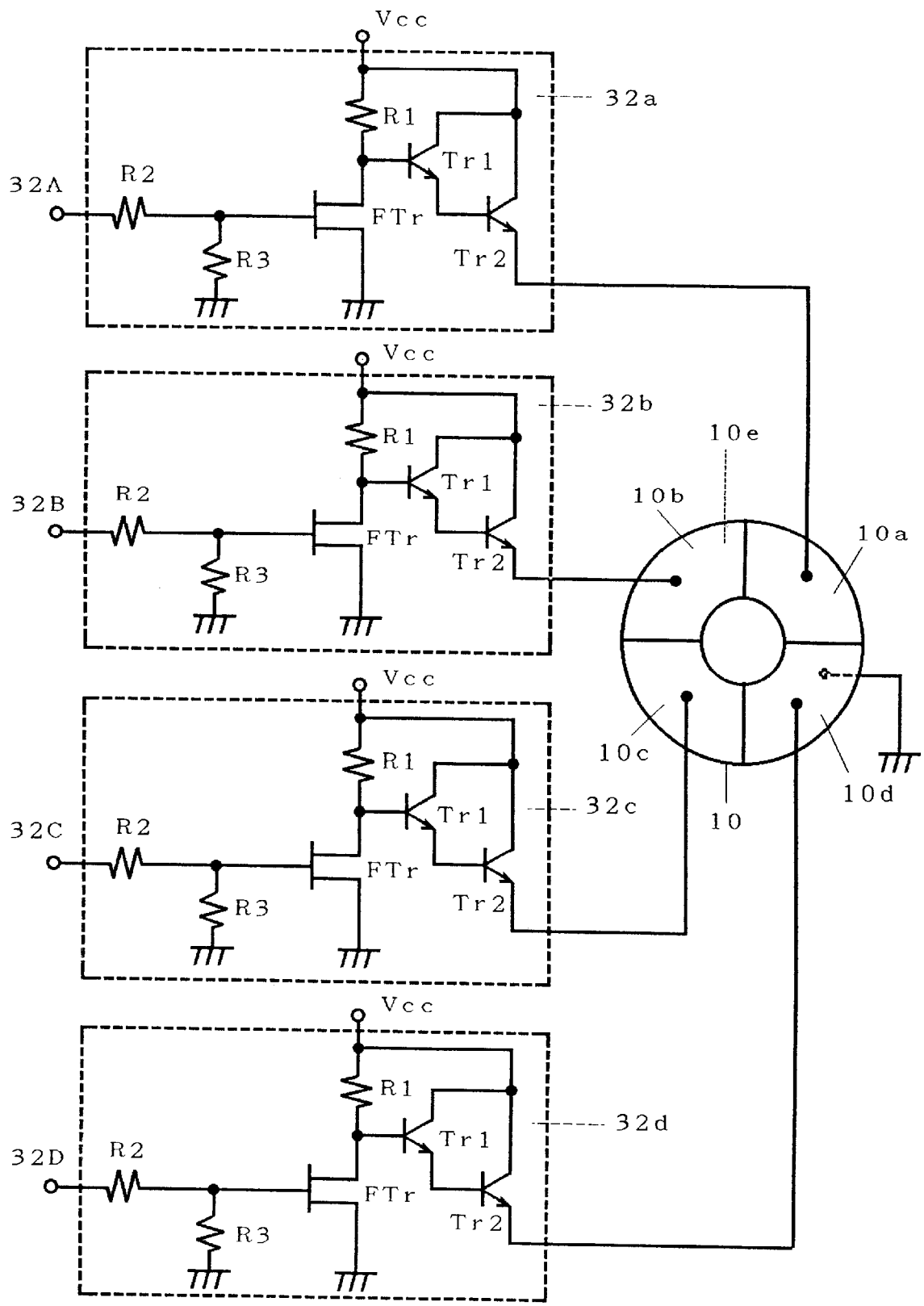
FIG. 20 shows a circuit view of an ultrasonic driving motor in the present invention.

FIG. 20 shows a circuit of an ultrasonic driving motor in the present invention. In drive circuits 32a, 32b, 32c and 32d, the drain of a field-effect transistor FTr is connected through a first resister R1 to a direct current source Vcc, the collectors of a first transistor Tr1 and a second transistor Tr2 are connected to the direct current source Vcc, the emitter of the first transistor Tr1 is connected to the base of the second transistor Tr2, the gate of the field-effect transistor FTr is connected through a second resistor R2 to signal input terminals 32A, 32B, 32C and 32D, the gate of the field-effect transistor FTr is connected through a third resistor R3 to ground, and the source of the field-effect transistor FTr is connected to ground.

In the ultrasonic vibrator 10 of the ultrasonic driving motor 26, an electrode on one side is divided into four of the same width from the center, the four electrodes 10a, 10b, 10c and 10d are respectively connected to emitters of the second transistors Tr2 of the drive circuits 32a, 32b, 32c and 32d, and the whole electrode 10e of another side of the ultrasonic vibrator 10 is connected to ground.

In the ultrasonic driving motor of the present embodiment, when off signals are applied to the signal input terminals 32A–32D of the drive circuits 32a–32d in turn, the field-effect transistor FTr becomes off, the first and second transistors Tr1 and Tr2 become on, the direct current voltage of the direct current source Vcc is applied from the drive circuits 32a–32d to the four divided electrodes 10a–10d, whereby a progressive wave is generated on the ultrasonic vibrator 10, and the contacting member 18 can be rotated by contacting under pressure with the edge of the ultrasonic vibrator 10.

In the present embodiment, the electrode on the one side of the ultrasonic vibrator 10 is divided into four, the direct current voltage is applied to the four divided electrodes 10a, 10b, 10c and 10d in turn from the drive circuits 32a–32d, whereby the progressive waves are generated on the edge of the ultrasonic vibrator 10, the composition of the ultrasonic vibrator 10 becomes simple, and heat generating in the ultrasonic vibrator 10 is discharged from the whole electrode 10e.

In the above embodiment, though the whole electrode 10e is connected to ground, the whole electrode may be directly connected to the direct current source, an excellent metal for discharging heat, e.g. aluminum is mounted as a whole electrode.

As explained above, in the ultrasonic driving motor in the present embodiment, since the four divided electrodes are mounted on the one side of the ultrasonic vibrator, the whole electrode is mounted on another side of the ultrasonic vibrator, the circuit composition of the present embodiment becomes simple, and because the excellent metal for discharge heat is used for the whole electrode, the heat generated in the ultrasonic vibrator can be discharged.

What is claimed is:

1. An ultrasonic driving motor comprising:
    an ultrasonic vibrator having a center hole and an edge for generating elliptically progressive waves,
    a contact member formed by plural divided parts,
    a ring-like elastic member which presses the contact member against the edge of the ultrasonic vibrator,
    a fixing member fixed in the center hole of the ultrasonic vibrator,
    a bearing mounted to the fixing member,
    a rotor rotatably mounted to the bearing member, and
    a connection member which connects the contact member to the rotor.

2. An ultrasonic driving motor according to claim 1, wherein said contact member and said connection member are formed as a single element.

3. An ultrasonic driving motor according to claim 1, wherein:
    said contact member includes projections and spaces at a side thereof,
    said connection member includes projections and spaces at an end thereof, and
    said projections and spaces of the contact member are connected to said spaces and projections, respectively, of the connection member.

4. An ultrasonic driving motor according to claim 1, wherein:
    said connection member includes spaces and projections,
    each divided part of said contact member includes a cut portion formed near one end thereof,
    said divided parts of the contact member are inserted into spaces of the connection member, and
    said projections of the connection member are inserted into the cut portions of the divided parts.

5. An ultrasonic driving motor according to claim 1, further comprising a long thin sheet inserted between the ultrasonic vibrator and the contact member.

6. A control circuit for driving an ultrasonic driving motor according to claim 1, comprising:
- an ultrasonic driving motor,
- an encoder which detects a number of revolutions of the ultrasonic driving motor,
- a central processing unit which receives an output of the encoder,
- a digital to analog converter which converts digital signals from the central processing unit to an analog voltage,
- a voltage to frequency converter which converts the analog voltage to frequency signals,
- a phase control circuit which regulates a phase of the frequency signals in response to an output from the central processing unit, and
- a drive circuit for driving the ultrasonic driving motor by phase controlled signals from the phase control circuit.

7. A control circuit for driving an ultrasonic driving motor according to claim 6, wherein
- said digital to analog converter regulates the frequency signals from the voltage to frequency converter to become higher than an optimum frequency of the ultrasonic driving motor,
- with the analog voltage of said digital to analog converter being changed while the central processing unit checks the number of revolutions of the ultrasonic driving motor in response to the output of the encoder such that the frequency of the frequency signals from the voltage to frequency converter becomes small, and
- with the analog voltage of said digital to analog converter being changed by small amounts at the optimum frequency of the ultrasonic driving motor in response to an output of the central processing unit.

8. A control circuit for driving an ultrasonic driving motor according to claim 6,
- wherein there are four said drive circuits, each drive circuit including:
  - a first bipolar junction transistor including:
    - a base,
    - an emitter, and
    - a collector connected to a direct current source,
  - a second bipolar junction transistor including:
    - a base connected to the emitter of the first bipolar junction transistor,
    - an emitter, and
    - a collector connected to a direct current source,
  - a field effect transistor including:
    - a drain connected through a first resistor to the direct current source and to the base of the first bipolar junction transistor,
    - a source connected to ground, and
    - a gate connected through a second resistor to an input signal terminal and through a third resistor to ground,
- four divided electrodes are formed on one side of an ultrasonic vibrator of the ultrasonic driving motor, each electrode being connected to the emitter of the second bipolar junction transistor of a respective driving circuit, with predetermined frequency signals having phases shifted 90 degrees from each other being applied in sequence to the four drive circuits for driving the ultrasonic vibrator, and
- a whole electrode formed on an opposite side of the ultrasonic vibrator of the ultrasonic driving motor and connected to ground.

9. A control circuit for driving an ultrasonic driving motor according to claim 8, wherein said whole electrode is also connected to the direct current source.

10. A control circuit for driving an ultrasonic driving motor according to claim 8, wherein said whole electrode is formed by a metal having a high heat discharge capability.

11. A control circuit for driving an ultrasonic driving motor according to claim 10, wherein the metal is aluminum.

* * * * *